United States Patent Office 3,078,627
Patented Feb. 26, 1963

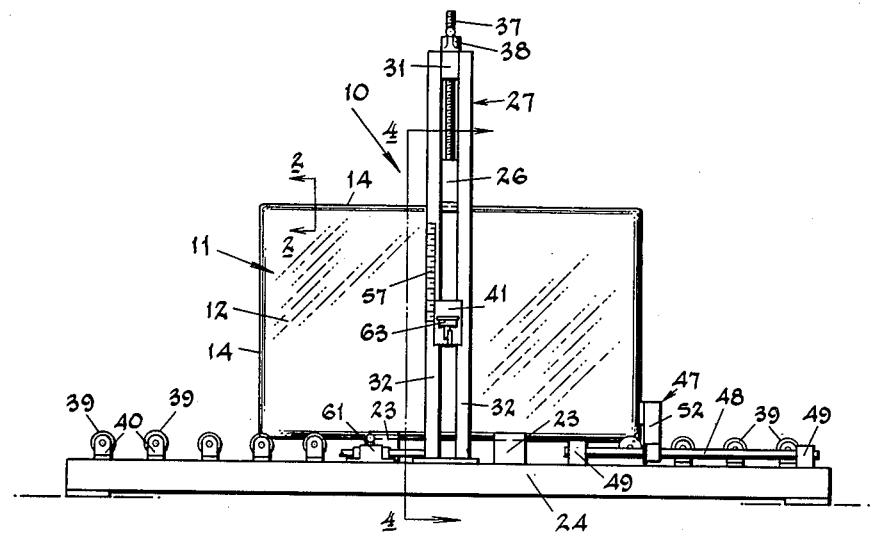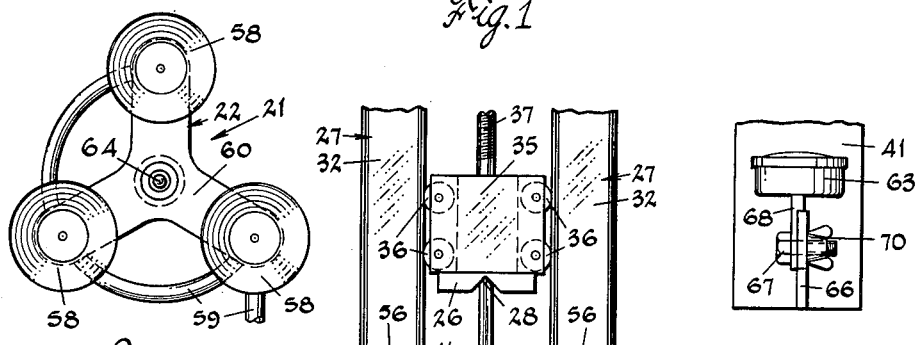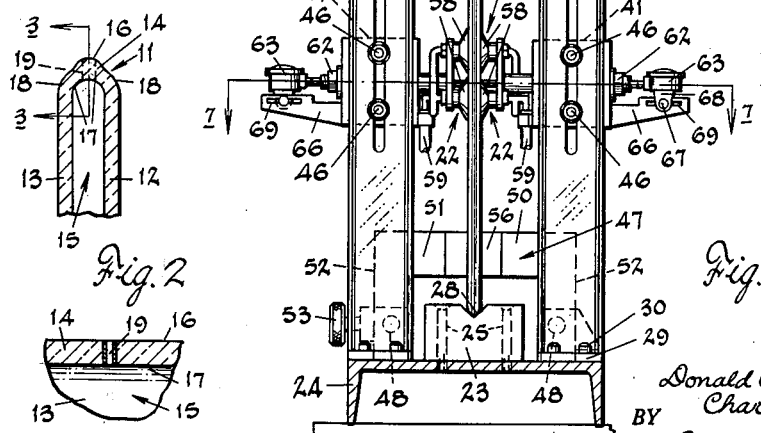

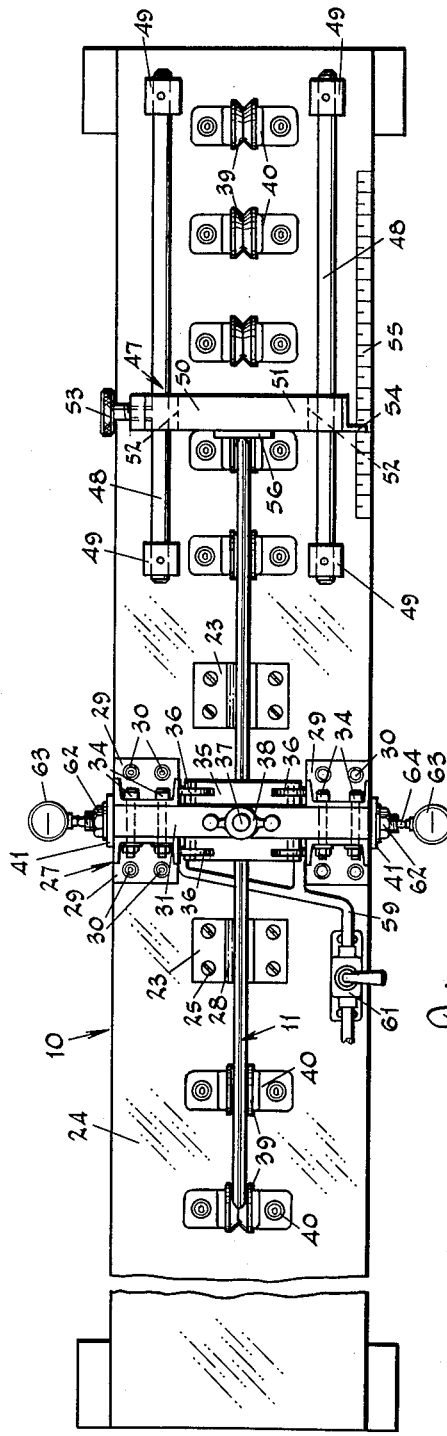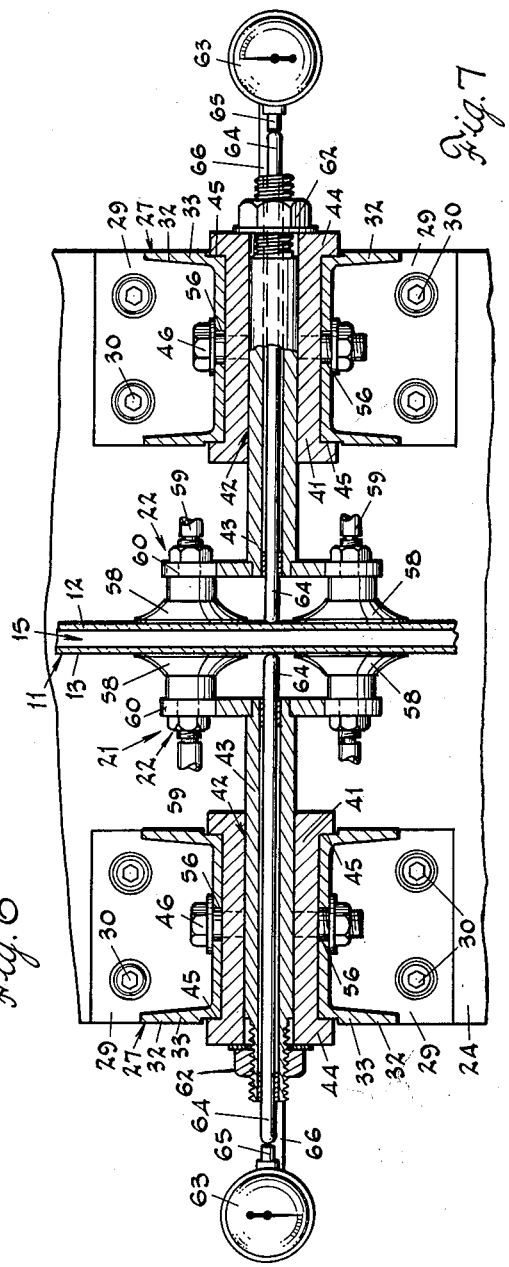

3,078,627
METHOD AND APPARATUS FOR FABRICATING ALL-GLASS MULTIPLE SHEET GLAZING UNITS
Donald W. Dunipace, Perrysburg, and Charles H. Cowley, Toledo, Ohio, assignors to Libbey-Owens-Ford Glass Company, Toledo, Ohio, a corporation of Ohio
Filed Nov. 15, 1960, Ser. No. 69,359
8 Claims. (Cl. 53—7)

This invention relates to all-glass multiple sheet glazing units of the type which comprise two or more sheets parallelly spaced apart in face-to-face relationship and joined together at their marginal edges by a continuous edge wall to provide a space between the sheets. More particularly, the invention relates to a method and apparatus for fabricating units of the above character.

In units of this type, the space between the glass sheets is hermetically sealed to provide a dead air space of high insulative value which space retards heat transfer through the unit. The inside pressure, that is the pressure within the air space, bears a definite, fixed relationship to the outside or atmospheric pressure at the time the unit is sealed, which relationship is dependent upon the temperature and barometric pressure of the locality in which the unit is sealed. If the temperature within the air space changes or if the barometric pressure of the atmosphere surrounding the unit changes, the relationship of inside and outside pressures would also change.

It will be appreciated that units of the above-described character are quite often shipped from their place of manufacture to many different areas and localities where the atmospheric conditions such as temperature and barometric pressure vary over a wide range. Thus, in service use, the relationship of inside and outside pressures also varies resulting in deflection or bowing of the sheets toward or away from each other depending upon which pressure is greater. Since glass is a relatively flexible material, such deflections of the sheets are not usually critical and do not result in stresses beyond the elastic limits of the glass except at sources of stress concentration such as would be experienced in the areas of bends or surface impairments. When such sources of stress concentration do exist, deflection of the sheets may result in stress in these areas which exceed the elastic limit of the glass thereby breaking the sheets and destroying the unit.

The primary object of the present invention is to provide a novel method and apparatus for fabricating units of the above character which units are less susceptible to damage resulting from changes in temperature or barometric pressure.

Another object is to fabricate the unit so that, when the air space is hermetically sealed, the pressure within the unit is such as to maintain the more critical areas of the unit under compression.

Still another object is to accomplish the foregoing by mechanically gripping the sheets intermediate their edges and bowing them outwardly away from each other before hermetically sealing the air space whereby, when the sheets are released, they move back toward each other thus increasing the inside pressure.

Other objects and advantages of the invention will become more apparent during the course of the following description when taken in connection with the accompanying drawings.

In the drawings wherein like numerals are employed to designate like parts throughout the same:

FIG. 1 is a side elevational view of an apparatus embodying the novel features of the present invention;

FIG. 2 is a fragmentary sectional view taken along line 2—2 of FIG. 1;

FIG. 3 is a fragmentary, sectional view taken along line 3—3 of FIG. 2;

FIG. 4 is a view taken along line 4—4 of FIG. 1;

FIG. 5 is a fragmentary elevational view of the vacuum gripping means;

FIG. 6 is a fragmentary plan view of the apparatus;

FIG. 7 is a fragmentary sectional view taken along lines 7—7 of FIG. 4; and

FIG. 8 is a fragmentary elevational view showing the indicator and its mounting.

For purpose of illustration, an apparatus 10 embodying the novel features of the present invention is shown in the drawings in conjunction with a multiple sheet glazing unit of the all-glass type. Illustrated herein is a double sheet glazing unit 11 which includes two sheets of glass 12 and 13 parallelly spaced apart in face-to-face relationship and joined at their outer peripheries by an integral edge wall 14 extending around the unit to enclose an air space 15 between the sheets. One well-known method of forming such units is to heat the marginal edge portions of the sheets 12 and 13 to their softening point enabling the portions to be bent toward each other and pressed into intimate contact whereby they fuse together and form the continuous edge wall 14. An edge wall 14 formed in this manner comprises a fused portion 16, inner curved portions 17 enclosed within the unit and outer curved portions 18 (FIG. 2).

It will be appreciated that if the sheets 12 and 13 are cooled to a temperature below the dew point of the air trapped in the space 15, the water vapor in the air will condense on the inner surface of the sheets. To avoid this objectionable condensation, the air in the space 15 may be replaced with dehydrated air or other relatively moisture-free gases. To this end, pore openings or holes 19 are formed in the unit through which holes the dehydrated air or gas may be introduced into the space to flush out and replace the moisture laden air. Herein, the pore holes 19 are formed in the edge wall 14 of the unit to extend through the fused portion 16 between the space 15 and the exterior of the unit 11 (FIG. 3).

As was noted above, after the air in the space 15 between the sheets has been replaced and the unit 11 sealed, the pressures within and without the unit will have a definite relationship to each other and the sheets 12 and 13 will be stressed in accordance with that relationship. If the pore holes 19 are left open to the atmosphere during the flushing process and until sealed, there will be no pressure differential between the space 15 and the exterior of the unit and the sheets will be under no appreciable stresses. However, when the units are placed in service use in different localities having different temperatures and/or barometric pressures, the relationship between inside and outside pressures changes, the sheets 12 and 13 deflect accordingly and the sheets, particularly the critical areas at the inner and outer curved portions 17 and 18, are stressed differently and in different amounts. Thus, when the conditions are such that the pressure becomes greater on the outside of the unit 11 than on the inside, the sheets 12 and 13 move toward each other placing the outer curved portions 18 in tension and the inner curved portions 17 in compression. Conveniently, if the sheets deflect outwardly away from each other, the outer portions 18 are placed in compression and the inner portions 17 in tension.

As is well known, glass, when cold, is flexible to a certain degree and sheets of glass will bend or deflect in response to forces which do not stress the glass beyond its elastic limit. It is also well known that glass is stronger in compression than in tension and that, when subjected to forces operable to stress the glass beyond its elastic limit, it is broken and it begins to break on the tension side with the break characteristically occurring at sources of stress concentration such as bends or surface imperfections.

Obviously the inner and outer curved portions 17 and 18 are the weakest part of the unit 11 and are the most susceptible to damage due to deflection of the sheets 12 and 13 since they are sources of stress concentration. Any other source of stress concentration centered at these portions will further weaken the unit. Such other sources may result from surface imperfections such as scratches, chips, weathering or other mars on the curved portions. Naturally, the inner curved portions 17, being inside of the unit, are protected from surface damage or mars of the type mentioned above. Such damage could easily occur at the exposed outer curved portions 18, however, and, therefore, these portions are the most critical; the most affected by tensional stresses caused by inwardly deflection of the sheets 12 and 13 resulting from a greater pressure outside the unit than exists inside the unit.

Since the outer curved portions 18 are the most critical areas, the areas in which destruction of the unit is most likely to initiate, it is desirable that these outer portions be reinforced by the appropriate addition of compressional stress in this region, thereby taking advantage of the superior strength of glass in compression. One way in which this may be accomplished is to pressurize the unit 11. By this it is meant that the gas within the space 15 between the sheets 12 and 13 is maintained at a greater pressure than the outside or barometric pressures encountered in normal service use.

The proper values for the resulting stresses at the outer and inner surfaces of the curved section are selected so as to increase the resistance to edge breakage resulting from service conditions which tend to put the outside surface in tension without unduly decreasing the resistance to edge breakage resulting from service conditions which tend to produce tension in the inner surface.

In accordance with the present invention, the unit 11 is pressurized by a novel method which is easier and less expensive to perform than prior known methods. This method consists of flexing or resiliently bowing at least one of the sheets of the unit outwardly before hermetically sealing the unit, thus permitting additional air or gas to drift into the space 15 through the pore holes 19 and then allowing the walls to approach their initial position, thereby placing the gas trapped between the sheets under a pressure greater than atmospheric. Herein, this is accomplished by the novel apparatus 10 which mechanically grips both of the sheets intermediate their edges, bows at least one of them away from the other and maintains the sheet in this bowed condition until the pore holes 19 are sealed.

In the illustrated embodiment of the apparatus 10, the sheets 12 and 13 are supported thereon in a fixed, substantially vertical position and a gripping means 21 including two gripping elements 22 engage the sheets 12 and 13 on opposite sides of the unit. The gripping elements 21 are movable toward and away from each other in a horizontal plane enabling them to be moved into gripping engagement with the sheets and subsequently moved apart to pull the sheets away from each other.

As shown in FIG. 1, the unit 11 is placed on the apparatus 10 in an upright position with its lower edge resting on lower support blocks 23 mounted on an elongated base channel 24 and secured thereto by bolts 25 passing through the blocks and threaded into the channel. The unit 11 is held in an upright position by an upper support block 26 carried on upright columns 27 and engaging the upper edge of the unit. To prevent lateral movement of the unit 11 as the sheets 12 and 13 are acted upon by the gripping means 21 and to locate the unit relative to the gripping means, inwardly opening grooves 28 are formed in the blocks 23 and 26 to receive the edges of the unit (FIG. 4).

In the present instance, the columns 27 are secured at one end to the base channel 24 by brackets 29 bolted to the channel as at 30 and project vertically upwardly therefrom on opposite sides of the lower blocks 23. One such column 27 is utilized at each side of the lower blocks 23 and the two columns are tied together at their upper ends by a cross member 31, the opposite ends of which are fixed to the upper ends of the columns.

Each of the columns 27 is formed from two elongated channel-shaped members 32 parallelly spaced apart and disposed back-to-back with the lateral flanges 33 on each member projecting outwardly away from the opposite member. The cross member 31 comprises a bar extending between the channel-shaped members 32 of each of the columns 27 and attached to the members 32 by threaded fasteners 34 (FIG. 6).

In order that the apparatus 10 may be adapted to support units 11 of various sizes, the upper support block 26 is adjustable toward and away from the lower blocks 23. For this purpose, the upper block 26 is mounted on a carriage 35 disposed between the upright columns 27 and having rollers 36 journaled thereon to roll along the inwardly directed faces of the opposed flanges 33 on the channel-shaped members 32 (FIG. 4). A threaded rod 37 having one end fixed to the upper side of the carriage 35 projects upwardly and through a hole bored in the cross member 31 to support the carriage. A hand nut 38 is threaded on the upper end of the rod 37 to bear against the upper surface of the cross member 31 whereby threading the nut 38 along the rod 37 moves the carriage 35 and thus the upper block 26 to any desired position relative to the lower blocks 23.

To aid in moving the units 11 onto and off of the lower support blocks 23, a plurality of rollers 39 are journaled on brackets 40 mounted on the base channel 24 in line with the blocks and spaced apart on opposite sides of the latter. The rollers 39 rotate in a vertical plane passing through the grooves 28 and have a grooved outer periphery to guide the unit 11 in substantial alignment with the grooves 28.

The gripping means 21 is carried by the columns 27 with the gripping elements 22 projecting inwardly toward each other in a horizontal plane. The elements 22 extend between the channel-shaped members 32 and are mounted on the latter through the medium of slide blocks 41 having a horizontally extending bore 42 which slidably receives a tubular portion 43 of the elements 22 (FIG. 7).

Herein, each of the slide blocks 41 is I-shaped in transverse cross section and is disposed between the channel-shaped members 32 with integral laterally extending flanges 44 lying along the outside surfaces of the flanges 33 on opposite sides of the member. The members are cut away as at 45 to receive the flanges 44 in close engagement therewith to prevent relative rotation between the blocks 41 and the members 32. The blocks 41 are secured to the members 32 by bolts 46 extending through the members 32 and the slide blocks.

In order to obtain the maximum latitude in control of deflection of the sheets 12 and 13, it is desirable that the gripping means 21 engage the sheets approximately in the center thereof. To this end, the units 11 are positioned on the blocks 23 relative to the columns 27 by a stop 47 adjustable toward and away from the columns to enable the apparatus to be utilized in the fabrication of various size units. In addition, the gripping means 21 is movable up and down in a vertical plane to compensate for variations in the dimensions of the units in the other direction.

As best shown in FIG. 1, the stop 47 comprises two rods 48 extending longitudinally of the channel 24 and parallelly spaced apart on opposite sides of the blocks 23. The rods 48 are mounted on brackets 49 fixed to the channel 24 and supporting the rods above the channel.

A U-shaped plate 50 is disposed transversely of the channel and includes a horizontal portion 51 projecting above the support block 23 and integral leg portion 52 extending downwardly toward the base channel 24. Each of the leg portions 52 are bored adjacent their lower ends to slidably receive the rods 48. The plate 50 is slidable back and forth along the rods 48 and may be locked in any position by means of a thumb nut 53 threaded into one leg portion 52 of the plate to bear against one of the rods 48 (FIG. 6). The stop 47 may be pre-set to accurately locate units of a given size relative to the columns 27 through the medium of a pointer 54 projecting outwardly from one leg portion 52 and over a scale 55 mounted on the base channel 24. A pad 56 of felt or a suitable soft material is fixed to the face of the plate 50, which pad engages the edge of the unit 11 to prevent marring the latter.

In order that the gripping means 21 may be positioned centrally of the sheet in a vertical direction, the slide blocks 41 are adjustable up and down along the columns 27. To this end, the bolts 46 pass through elongated slots 56 formed in the members 32. Predetermined settings corresponding to units of a given size may be made by utilizing a scale 57 fixed to one of the columns and cooperating with the upper edge of one of the slide blocks 41.

In the present instance, the gripping means 21 includes vacuum cups 58 mounted on the inner end of the elements 22 and coupled by flexible tubing 59 to a suitable source of vacuum (not shown). The cups 58 are fixed to a plate 60 secured to the inner end of the tubular portions 43 extending through the slide blocks 41. In the exemplary apparatus, three such cups 58 are mounted on each element 22. The cups are angularly spaced apart and coupled together by the flexible tubing 59 leading to the vacuum source through a valve 61 mounted on the base channel 24 (FIG. 6). The cups 58 are moved into contact with the sheets 12 and 13 as the tubular portions 43 are slid inwardly through the bore 42. After the valve 61 is opened connecting the vacuum source to the cups whereby the latter grips the sheets, the cups are pulled away from each other by turning a nut 62 threaded on the outer end of the tube 43 and bearing against the outer face of the slide blocks 41.

The magnitude of the distance through which each sheet is moved may be determined by any number of methods such as measuring the force required to bow the sheets or measuring the actual distance a portion of each sheet moves from its initial position. Herein, the latter method is utilized.

The distance the sheets 12 and 13 are bowed apart is recorded on indicators 63 associated with each of the tubes 43. As shown in FIG. 7, this is accomplished herein by a rod 64 projecting through the tube 43 with one end engaging the outer surface of the glass sheets 12 and 13 and the other end engaging plungers 65 on the indicators 63. Each indicator 63 is mounted on a bracket 66 fixed to the slide block 43 and extending outwardly therefrom. The indicator 63 is mounted by means of a bolt 67 extending through a projection 68 on the back of the indicator and through a slot 69 formed in the bracket (FIG. 4). The indicator 63 may be locked in any desired position by a wing nut 70 threaded on the bolt 67 (FIG. 8).

In fabricating a multiple sheet glazing unit with the apparatus of the present invention, the unit 11 is positioned on the lower support block 23 in abutting engagement with the stop 47. The upper block 26 is then adjusted downwardly to engage the upper edge of the unit; the stop 47 and the slide blocks 41 being positioned so that the suction cups 58 will contact the sheets substantially in the center of the unit. As noted above, the proper setting of the slide block 41 and the stop 47 may be accomplished in advance for any particular size unit by means of the scale 55 on the base channel 24 and the scale 57 on the column 27. With the unit thus positioned and the slide blocks thus adjusted, the vacuum cups 58 are moved inwardly into contact with the sheets by sliding the tubes 43 toward each other and, upon opening of the valve 61, grip the sheets. The rods 64 are slid through the tube 43 so that their inner ends engage the outer surface of the sheets 12 and 13. The indicator 63 is subsequently slid along the bracket 66 until the plunger 65 engages the outer ends of the rods 64 after which it is locked in place. By turning the nuts 62 threaded on the outer end of the tubes 43, the suction cups 58 and thus the sheets are moved outwardly to resiliently bow the sheets away from each other a previously calculated distance. This distance the sheets are drawn apart is calculated to result in a final pressure of the gases between the sheets which will be greater than the range of pressure through which the unit will be subjected in normal service use. These calculations would take into account the length and width of the sheets, the width of the air space, the thickness of the glass and the ambient conditions. Outward movements of the sheets push the rod through the tube and against the plunger; the movements of the plunger being registered on the indicator.

With the sheets thus drawn apart, dehydrated air or gas is introduced into the space 15 between the sheets through the pore holes 19 formed in the edge wall of the unit 11. When this gas has flushed out and replaced substantially all of the air in the space 15, the pore holes 19 are sealed and the valve 61 is closed to disconnect the vacuum cups 58 from the vacuum source. When the gas is introduced into the unit, the pore holes 19 are open to the atmosphere and therefore, at the time the hole is sealed, the gas is at ambient pressure and temperature. Disconnecting the vacuum cups from the vacuum source releases the sheets 12 and 13 and permits them to move together and approach their initial position. The gas in the space will then be under pressure and exert an outwardly directed force on the sheets, which force results in a compressive stress at the outer curved surface 16.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:

1. In a method of producing a glazing unit of the type comprising spaced sheets of glass joined together at their marginal edges to form an air space therebetween, which space communicates with the atmosphere through a pore opening, the steps of, gripping said sheets intermediate their edges, resiliently bowing said sheets outwardly away from each other, hermetically sealing said pore opening while said sheets are bowed apart and subsequently releasing said sheets allowing the latter to spring back toward their initial position to compress the air trapped between the sheets whereby the pressure tending to push the sheets apart is greater than the barometric pressure in all conditions of normal service use of the unit.

2. In a method of producing a glazing unit of the type comprising spaced sheets of glass joined together at their marginal edges to form a space therebetween, which space communicates with the atmosphere through pore openings, the steps of, supporting said unit in a fixed plane, gripping at least one of said sheets intermediate its edges, resiliently bowing said one sheet outwardly away from said other sheet, hermetically sealing said pore openings while said one sheet is bowed away from said other sheet and subsequently releasing said one sheet to permit the latter to spring back toward its initial position thereby to compress the gas trapped within said space creating a pressure within said space greater than the barometric pressure in all conditions of normal service use of the unit.

3. In apparatus for producing a glazing unit of the type comprising spaced sheets of glass disposed face-to-face and joined together at their marginal edges to define a space therebetween, which space communicates with the atmosphere through a pore opening, the combination of, means supporting said unit in a fixed plane, gripping means disposed on opposite sides of said unit and movable toward and away from said plane, means moving said gripping means apart to bow the sheets away from each other, indicating means associated with said gripping means and operable to register the distance said sheets are bowed apart.

4. In apparatus for producing a glazing unit of the type comprising spaced sheets of glass joined together at their marginal edges and forming a space therebetween, which space communicates with the exterior of said unit through a pore opening, the combination of a frame, means supporting said unit on edge on said frame, gripping means disposed on opposite sides of said unit and slidably mounted on said frame to move toward and away from said unit in a plane normal to said sheets, said gripping means being adapted to engage and grip the outer surface of said sheets on opposite sides of said unit, means moving said gripping means away from each other to resiliently bow said sheets apart, whereby when said pore opening is hermetically sealed and the sheets released the pressure within said space is greater than atmospheric.

5. In apparatus for producing a glazing unit as defined in claim 4, in which said frame comprises a base member having two upright columns fixed thereto on opposite sides of said support means, an adjustable stop mounted on said base member to position said unit relative to said columns, slide blocks fixed to said columns to slidably carry said gripping means, said slide blocks being movable up and down along said upright columns.

6. In apparatus for producing a glazing unit as defined in claim 4, in which said gripping means comprises vacuum cups operable to engage said sheets on opposite sides of said unit and means selectively applying vacuum to said cups whereby the latter grip said sheets.

7. In apparatus for producing a glazing unit as defined in claim 5, in which said gripping means includes an elongated tubular portion slidably mounted in a block fixed to said upright column, a rod extending through an internal bore in said tube with one end engaging said sheet and the other end projecting beyond the opposite end of said tube and indicator mechanism mounted on said column adjacent said rod whereby movements of the rod are registered upon said indicator mechanism.

8. In apparatus for producing a glazing unit of the type comprising spaced sheets of glass disposed face-to-face and joined together at their marginal edges to form a space therebetween, which space communicates with the atmosphere through pore openings, the combination of, means supporting said unit in a fixed plane, gripping means mounted adjacent said plane to move toward and away from said unit and operable to be releasably secured to at least one of said sheets, means moving said gripping means away from said plane after the gripping means is secured to said one sheet thereby to bow said one sheet outwardly away from the other sheet and hold it there until said pore openings are hermetically sealed.

References Cited in the file of this patent
UNITED STATES PATENTS

| | | |
|---|---|---|
| 2,453,338 | Pajak | Nov. 9, 1948 |
| 2,736,075 | Baker | Feb. 28, 1956 |
| 2,964,878 | Montgomery et al. | Dec. 20, 1960 |